July 27, 1965　　　　J. W. MEESE　　　　3,196,652

SWAGING BACK-UP ROLLERS

Filed March 4, 1963

INVENTOR.
John W. Meese
BY
J. D. Douglas
His ATTORNEY

United States Patent Office 3,196,652
Patented July 27, 1965

3,196,652
SWAGING BACK-UP ROLLERS
John W. Meese, Avon, Ohio, assignor to The Ridge Tool
Company, Elyria, Ohio, a corporation of Ohio
Filed Mar. 4, 1963, Ser. No. 262,685
5 Claims. (Cl. 72—70)

This invention relates to pipe and tubing cutters.

It has become a common practice to provide tubing or pipe cutters wherein a frame is used, which may be, but is not necessarily, C-shaped. One end of the structure usually carries a pair of back-up rolls, which are brought into engagement with the pipe or tube and the other end carries a screw member having a cutter wheel having a wedge shaped edge which is advanced by the screw or other means into engagement with the pipe or tube. The advancement of the cutter wheel may be by means other than a screw, such as a lever or ratchet means. The cutter wheel is forced into the pipe or tube, since relative movement between the frame and tube is prevented by the back-up rolls. At the same time the pipe or tube and cutter are rotated relative to each other and the pressure of the cutter against the pipe is increased during this rotation, to cause a parting or severing of the tube or pipe into two parts. Some cutters use a plurality of cutter blades engaging the tube or pipe from opposite sides and have no back-up rolls.

The use of the back-up rolls also performed the function of providing a bearing surface in engagement with the pipe or tube, which kept the cutter with the blade normal to the axis of the tube.

Some of the more common devices of this character are exemplified by Patents D. 191,011; 3,022,575 and 2,871,733.

When pipe or tubing is severed by the above means, the severing is caused by a displacement of the metal rather than the removal thereof, as would occur if the pipe was sawed. The result is that most frequently the material of the tube which may be metal or plastic is actually moved outwardly adjacent the points of severance, particularly at the start of the severing operation and the pipe or tube assumes an enlarged diameter on each side of the place where it is cut.

The purpose of severing the tube was to provide predetermined lengths of pipe which could be joined with other tubes by the use of couplings or inserted in fixtures, as is well known in the art. In the case of copper tubing, the cut end is usually telescoped into a coupling with such a close sliding fit that, when the joint is soldered or brazed, capillary attraction causes the solder or other melted metal to flow into the space between the periphery of the tube and the inner wall of the coupling. With tubes cut in the above manner, the enlargement on the end of the tube caused by the displacement of the metal frequently prevented the insertion of the end of the pipe into the coupling. This made it necessary to grind or file off the periphery of the tube to eliminate the enlargement, which was difficult and time-consuming. In cases where the pipe is subsequently threaded, the enlargement interferred with the starting of the threading die onto the end of the pipe.

In the case of plastic tubing where a flange is thrown up in the same manner, that flange, where the cement has been applied in the fitting, had a tendency to wipe away the cement and spoil seal when the end was inserted in the fitting.

The present invention contemplates a means whereby, when the pipe or tubing is cut in the above manner, the flange or enlargement is eliminated during the process of cutting, without the removal of material by providing a back-up roll for a tube cutter having a central non-resilient portion for rolling engagement with the zone of material displaced by a cutter blade and with flanking portions for engagement with the article at points spaced from the points of severence to hold the blade normal to the axis of the article.

Still other advantages of the invention and the invention itself will become more apparent from the following description of some embodiments thereof, which description is illustrated by the accompanying drawings and forms a part of the specification.

Briefly, the invention contemplates a back-up roll which provides a localized pressure at the points on the tube where the material is displaced outwardly, and, more specifically, in addition to the above, the provision of means for stabilizing the position between the tube and cutter at the beginning of the cut so that the cutter blade is maintained normal to the axis of the tube at the start of the cutting operation as well as at all times during the tube severing operation, and wherein the stabilizing portions may recede as the cutting proceeds to provide the desired localized pressure.

Figure 1:
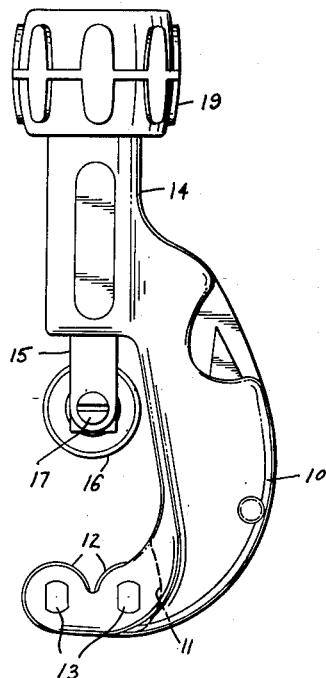
FIG. 1 is a slide elevational view of a tubing cutter suitable for use with the invention.
Figure 2:
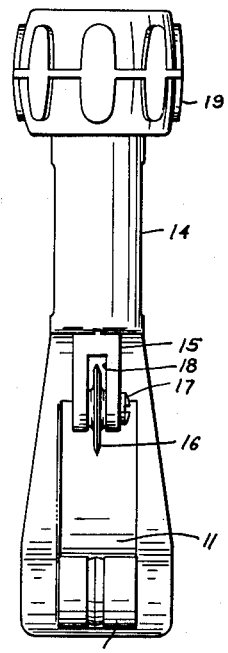
FIG. 2 is a view at right angles to FIG.1.

Referring now to the drawings, throughout which like parts are designated by like reference characters, in FIGS. 1 and 2 there is illustrated a tubing cutter which may comprise a C shaped frame 10, the lower end of which has a pocket 11, in which a pair of back-up rolls 12 are journalled on pins 13 in closely spaced relation to each other. The other end of the frame is formed with a hollow stem 14 in which a cutter advancing slide 15 is journalled. The slide has a cutter 16 wheel disposed in a slot 18 and journalled on a pin 17 bridging the slot. The slide is adjustable toward and from the rolls 12 by operating a knob 19, all in a manner as is well known in the art.

It is pointed out that the invention may be used in conjunction with any type of tube or pipe cutter other than that shown, wherein back-up rolls are provided for enabling pressure to be exerted on the cutter blade, and that the illustration of a specific type is merely for the purpose of clarification of the invention and not intended to be one of limitation.

As is well known, the article to be cut, which may be a tube or pipe, is placed in contact with the rollers and the cutter advanced by the advancing mechanism until it contacts the article on the side opposite to the back-up rolls. Then, as the cutter advancing mechanism advances the cutter wheel, the rollers exert pressure on the article on the opposite side to the cutter wheel and it is forced into the article. At the same time the article and cutter are rotated relative to each other so that the cutter wheel travels around the pipe.

Figure 3:
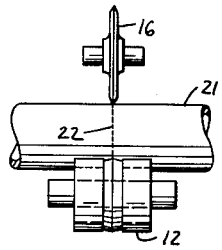
FIG. 3 is a diagrammatic view of a cutter blade and with a back-up roll of this invention, showing their relation to a tube at the start of a cutting operation.

FIG. 3 shows the position of the cutter relative to the article 21 at the start of such a cutting operation. The dotted line 22 indicates the line along which the article will be severed.

The rotation is continued and pressure applied until the article is parted.

It is highly desirable that the back-up rolls have sufficient contact with the pipe longitudinally of the pipe to stabilize the relative position between the cutter and the pipe to the end that the cuter blade is perpendicular to the axis of the pipe, in order that the end of the pipe be normal to the axis after the cut. A failure to do this, particularly at the start, enables the frame, and with it the cutter blade, to tilt. This may cause the cutter to travel around the pipe in a helical path and possibly not cut at all. In previous cutters it is customary to provide the rolls having a substantial length as shown to stabilize the frame and tube relative to each other.

Figure 4:
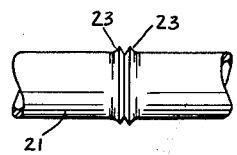
FIG. 4 shows the ends of a piece of tube that has been severed by a cutter having four cutter blades and no back-up rolls and the effect of such cutting.

In previous cutters, as the cutting operation proceeds, the metal is displaced, FIG. 4 outward and laterally as at 23. This action starts immediately at the start of the cut. Although the back-up rollers of the prior cutters ride on this flange, the tendency is for the roller to cant slightly with one end engaging the wall of the article laterally of the peripheral projection and the intermediate part to ride on the projection. The effect is to flatten the projection slightly as shown at 23a, FIG. 5, but not to eliminate the projection completely. Incidentally, the projection as shown in FIG. 4, will be exactly as shown when a cutter of the type using four cutter wheels, as shown in Patent No. 3,031,237, is used.

As previously mentioned, the projection portions very often prevent the article from being telescoped into the coupling.

Figure 5:
FIG. 5 shows a single end of a tube illustrating another effect of the severing where the cutter has conventional back-up rolls.

I have found that by concentrating the pressure of the back-up rolls in a narrow zone at the place where the material is being displaced, the concentration of this pressure can completely eliminate the outwardly projecting portions shown in FIGS. 4 and 5 by rolling the projection down as fast as it is displaced upward. By the improvement I am still able to provide the stabilizing contact with the article in such a manner that the cutter wheel remains normal to the axis of the article being cut.

Figure 6:
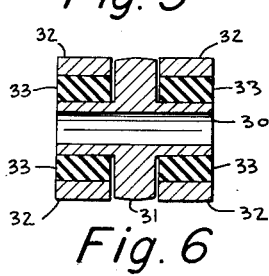
FIG. 6 is a vertical medial section through a back-up roll constructed according to the invention.

As best shown in FIG. 6, which is a medial section through a roller constructed according to my invention, the improved roller includes a hub 30 arranged to be journalled on a pin such as 13. Medially of the hub there is an outwardly extending flange 31. The hub and flange may be made integral or in two parts. It is preferably made of hard metal and therefore provides a substantially non-resilient portion. The periphery of the flange may be crowned.

Flanking the flange, on each side, are a pair of rings 32 which are held in spaced relatioin from the hub by rubber or other resilient spacers 33. It is preferred that a resilient substance, which will not deteriorate in the presence of oil, be used.

The rings 32 may move laterally or normal relative to the axis of the roller when pressure is exerted on the periphery thereof.

The flange 31 should preferably be of the same diameter as the rings 32 but it may be slightly less.

Figure 7:
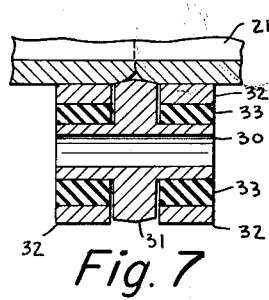
FIG. 7 is a view of the same roll and showing its manner of engagement with a piece of pipe, shown in fragment, during the process of severing the same.

When the rollers of FIG. 6 are substituted for those commonly in use, the action that takes place can best be understood from FIG. 7. As the pressure of the rollers against the article increases, the periphery of the central flange 31 engages with the periphery of the tube in a zone opposite to and on adjacent sides where the metal is being displaced. At the same time the rings 32 can move due to the displacement of the rubber 33. This causes a concentration of the force at the place where the metal is being displaced and the metal displaced is immediately ironed down.

The durometer of the rubber or other resilient material 33 should be such that sufficient pressure is exerted by the rings 32 on the article, particularly at the start of the cutting operation, to prevent canting of the cutter blade relative to the tube.

I have found it expedient to construct the roller as shown in FIG. 6. The rings 32 may have rubber vulcanized or cemented to the interior thereof. The hole in the rings may be slightly smaller than the hub and, when assembled, there is a slight displacement of the rubber, which holds it under compression and facilitates handling of the roller as a unit.

Figure 8:
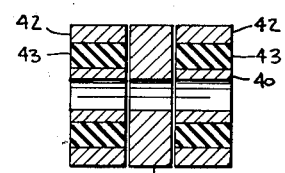
FIGS. 8 to 11 inclusive show modifications of the back-up roll.

It is within the purview of my invention, however, to make the roller in three or more parts,, as shown in FIG. 8. In this instance, the non-resilient portion 41 is in the form of a disc and it is flanked by a pair of discs of a composite nature comprising the outer rings 42 and the inner resilient body 43. A metallic inner ring or hub 40 is provided inside of each resilient body. This last ring is optional since, if the body 43 was of rubber, it could be harder at the center and thus make a separate bearing 40 unnecessary.

With the construction of FIG. 8, it is apparent that longer or shorter rollers could be made as desired. Furthermore the center disc 41 could be made up of a series of thin discs and these built up to provide a non-resilient part of various widths. In addition to the foregoing, the non-resilient portion could be moved to one side or the other of the resilient portion to act in combination with cutter wheels which did not line up with the center of the rollers, either intentionally or accidentally.

Figures 9, 10, 11:

The non-resilient disc element illustrated in FIGS. 6 and 7 is shown with its periphery having a raised or crowned center portion in the form of an external inverted V. In this case the lateral extremities define a boundary of less diameter than the rings 32, while the apex is of substantially the same diameter. It is within the purview of the invention to vary the contour of this disc member, as shown in FIGS. 8 to 11. In FIG. 8 it is shown as a cylindrical surface. In FIG. 9 it is shown as a convexly crowned surface. In FIG. 10 it is shown as an inwardly extending V, and in FIG. 11 as an inwardly extending concave surface.

I have found that with back-up rolls constructed according to the invention, that the metal displaced is immediately rolled back into position and when the pipe or tube is finally removed there is no outwardly extending portion adjacent the cut ends.

I also contemplate that the resilient portions 33 of the roller could be made of a semi-resilient plastic such as nylon or its equivalent. Furthermore it is possible that the parts 32–33 could be replaced by a single element made of nylon and that the rings 42–43 could be nylon of equivalent plastic having the ability to distort sufficiently to allow the perphery to recede when pressure is applied and thus cause a high intensely localization of pressure by the non-resilient part 31.

Having thus described the invention in some embodiments thereof, I am aware that numerous and extensive departures may be made therefrom without departing from the spirit or scope of the invention as defined in the appended claims.

I claim:

1. A back-up roll for pipe and tubing cutters which have a wedge shaped blade arranged to be forced into the article being cut and to cause displacement of the material of the article in a direction outward of the periphery of the tube comprising a narrow rotatable roller member comprising a hub with an upstanding flange, said flange having a width substantially equal to the metal which will be displaced by the blade with which the roller is to be used, said member being arranged to engage with the article opposite to the place it is being cut and to roll down the material upset by the blade and at least one stabilizing member is disposed to one side of the first member and engages the article laterally of the first member, said first member being held against movement laterally of its axis and said stabilizing member being mounted for movement laterally of its axis.

2. A back-up roll for pipe and tubing cutters wherein a frame is arranged to be rotated circumferentially relative to a pipe or tube and carries a wedge shaped blade arranged to be forced into the article being cut with the back-up rolls arranged to engage with the article on the side opposite to the cutter blade, comprising a support for rotatably supporting the roll, said back-up roll comprising a central non-resilient portion for engagement with the article being severed in a narrow zone for rolling down the material being displaced outwardly opposite the severance points and having flanking resilient portions for engagement with the article at points spaced from the points of severance for supporting the cutter with the blade normal to the axis of the article during the cutting operation.

3. A device as described in claim 2, wherein the non-resilient portion has a crowned periphery.

4. A back-up roll for pipe and tubing cutters wherein a frame is arranged to be rotated circumferentially relative to a pipe or tube and having a wedge shaped cutter blade carried by the frame is arranged to be forced into the article being cut and the back-up rolls are arranged to engage the article on the side opposite to the cutter blade, comprising a support for rotatably supporting the roll, said back-up roll having a hub journalled on the support and a non-resilient narrow flange portion extending outwardly from the hub and being wide enough and arranged to engage the article in a zone opposite the place where the article is being cut to roll the material displaced outwardly of the article inward, said roll being provided with a hub on each side of the flange portion and a pair of tube engaging rings resiliently mounted on the hub and arranged to engage with the article and movable relative to the flange portion for holding the cutter blade normal to the axis of the article as it is being cut.

5. A device as described in claim 4, wherein said last rings are arranged to move relative to the non-resilient portion whereby the pressure exerted on the article by the non-resilient portion is greater than that of the resilient portions.

References Cited by the Examiner
UNITED STATES PATENTS

| | | | |
|---|---|---|---|
| 426,171 | 4/90 | Comstock | 30—102 |
| 439,407 | 10/90 | Kemp et al. | 30—102 |
| 565,267 | 8/96 | Griffin | 30—102 |
| 801,866 | 10/05 | Headson | 30—102 |
| 1,215,120 | 2/17 | Cramer | 30—94 |
| 1,330,476 | 2/20 | Klug | 30—102 |
| 1,674,440 | 6/28 | McCloskey | 30—102 |
| 2,271,033 | 1/42 | Petersen | 30—102 |
| 2,515,627 | 7/50 | Capewell | 30—102 |
| 2,941,291 | 6/60 | Fritch | 30—102 |

WILLIAM FELDMAN, *Primary Examiner.*